United States Patent
Thayer et al.

(10) Patent No.: US 11,748,497 B2
(45) Date of Patent: Sep. 5, 2023

(54) BIOS ACCESS

(71) Applicant: Hewlett-Packard Development Company, L.P., Spring, TX (US)

(72) Inventors: Alexander Thayer, Palo Alto, CA (US); Mary G. Baker, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/054,597

(22) PCT Filed: Sep. 28, 2018

(86) PCT No.: PCT/US2018/053316
§ 371 (c)(1),
(2) Date: Nov. 11, 2020

(87) PCT Pub. No.: WO2020/068102
PCT Pub. Date: Apr. 2, 2020

(65) Prior Publication Data
US 2021/0209238 A1      Jul. 8, 2021

(51) Int. Cl.
*G06F 21/60* (2013.01)
*G06F 21/31* (2013.01)
*G06F 21/57* (2013.01)
*G06F 21/79* (2013.01)

(52) U.S. Cl.
CPC ............ *G06F 21/608* (2013.01); *G06F 21/31* (2013.01); *G06F 21/572* (2013.01); *G06F 21/604* (2013.01); *G06F 21/79* (2013.01)

(58) Field of Classification Search
CPC ...... G06F 21/608; G06F 21/31; G06F 21/572; G06F 21/604; G06F 21/79
See application file for complete search history.

(56) References Cited

U.S. PATENT DOCUMENTS

| 10,269,009 | B1 * | 4/2019 | Winklevoss | ........... G06Q 20/36 |
| 2004/0111633 | A1 | 6/2004 | Chang | |
| 2012/0054493 | A1 * | 3/2012 | Bradley | ................ H04W 8/005 |
| | | | | 713/168 |

(Continued)

FOREIGN PATENT DOCUMENTS

| EP | 1780979 | 5/2007 |
| JP | 2006304199 | 11/2006 |
| JP | 2007189742 | 7/2007 |

OTHER PUBLICATIONS

Intel, "BIOS Recovery Update Instructions", captured Mar. 2016, pp. 1-2, obtained from https://web.archive.org/web/20160327152728/ https://www.intel.com/content/dam/support/us/en/documents/motherboards/desktop/sb/biosrecoveryupdateinstructions.pdf (Year: 2016).*

*Primary Examiner* — Kevin Bechtel
*Assistant Examiner* — Forrest L Carey
(74) *Attorney, Agent, or Firm* — Knobbe, Martens, Olson & Bear, LLP

(57) ABSTRACT

Examples associated with BIOS access are described. One example device includes receiving data associated with a basic input/output system (BIOS) access request. The data may be received by a print device. The access request may be for a computing device. The method also includes printing a set of instructions for accessing the BIOS of the computing device.

15 Claims, 6 Drawing Sheets

(56) References Cited

U.S. PATENT DOCUMENTS

| | | | |
|---|---|---|---|
| 2013/0031623 A1* | 1/2013 | Sanders | G06F 21/00 726/19 |
| 2014/0118780 A1 | 5/2014 | Kimura | |
| 2014/0136828 A1* | 5/2014 | Lewis | H04L 69/326 713/2 |
| 2014/0230078 A1 | 8/2014 | Graham | |
| 2015/0277930 A1 | 10/2015 | Sarangdhar et al. | |
| 2018/0144146 A1 | 5/2018 | Juriasingani | |

* cited by examiner

BIOS ACCESS

BACKGROUND

A computer's basic input/output system (BIOS) includes instructions for starting up a computer, for interfacing with components of the computer during runtime, and for providing various other services while the computer is operating. Often, the BIOS serves as device firmware that is pre-installed on a device by a manufacturer of the device and may be protected from undesirable intrusion via various security measures including, for example, a password to prevent modification of the BIOS.

BRIEF DESCRIPTION OF THE DRAWINGS

The present application may, be more fully appreciated in connection with the following detailed description taken in conjunction with the accompanying drawings.

DETAILED DESCRIPTION

While the basic input/output system (BIOS) of a device is critical to booting the device and during normal operation, it is rare for the BIOS to be adjusted unless something has gone wrong. Consequently, an infrequently accessed BIOS that is protected by a password may become an inaccessible BIOS once the password has been forgotten. This may cause a user to take a more drastic approach (e.g., a factory reset) when restoring a device to a usable state if the user cannot remember how to access a device's BIOS. While some individuals may write down the password or store it in plain text on another device (e.g., a cell phone), these too may be ineffective if the paper is lost, the other device is replaced, and so forth. Additionally, writing down plain text passwords is insecure.

Consequently, as disclosed herein, a device may be paired with a connected print device in such a way that, a BIOS password can be stored in the print device. The password may be stored along with secure information that allows the printer to authenticate legitimate password requests from the device, and then print instructions for accessing the BIOS of the device. These instructions may include the password, directions for recovering the BIOS and/or operating system of the computer, and so forth. These techniques may be bolstered when a manufacturer is able to include hardware, firmware, and/or software within the device and/or the printer that facilitate verifying and pairing the device and printer.

It is appreciated that, in the following description, numerous specific details are set forth to provide a thorough understanding of the examples. However, it is appreciated that the examples may be practiced without limitation to these specific details. In other instances, methods and structures may not be described in detail to avoid unnecessarily obscuring the description of the examples. Also, the examples may be used in combination with each other.

"Module", as used herein, includes but is not limited to hardware, instructions stored on a computer-readable medium or in execution on a machine, and/or combinations of each to perform a function(s) or an action(s), and/or to cause a function or action from another module, method, and/or system. A module may include a microprocessor controlled via instructions executable by the microprocessor, a discrete module, an analog circuit, a digital circuit, a programmed module device, a memory device containing instructions, and so on. Modules may include gates, combinations of gates, or other circuit components. Where multiple logical modules are described, it may be possible to incorporate the multiple logical modules into one physical module. Similarly, where a single logical module is described, it may be possible to distribute that single logical module between multiple physical modules.

Figure 1:
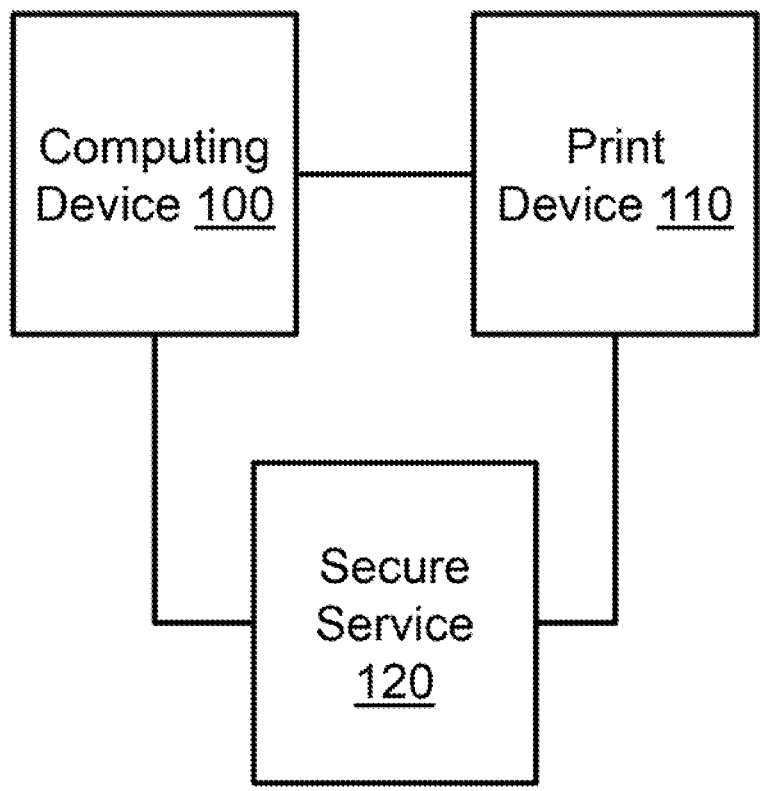
FIG. 1 illustrates example devices associated with BIOS access.

FIG. 1 illustrates example devices associated with BIOS access. The devices include a computing device 100, and a print device 110. In some examples, various techniques described herein may occur while computing device 100 and print device 110 are collocated in a single space (e.g., a room). In other examples, computing device 100 may be remote from print device 110, and certain techniques described herein may be facilitated via secure service 120.

Computing device 100 may include a basic input/output system (BIOS). The BIOS of computing device 100 may perform various functions associated with starting up computing device 100, supporting hardware connected to computing device 100, providing runtime services for computing device 100, and so forth. If the BIOS became compromised by code provided a malicious entity, that entity may be able to steal data from computing device 100, prevent operation of computing device 100, and so forth. Consequently, it may be desirable to secure the BIOS of device 100. One technique for securing the BIOS may include password protecting the BIOS, to prevent certain types of changes from being made to the BIOS. However, as changes to the BIOS may be made infrequently, it may be desirable to provide a user of computing device 100 alternative methods of remembering or recovering the password.

To that end, computing device 100 may initiate a pairing process with print device 110, or in some cases a secure service 120. The pairing process may involve, for example, the two parties certifying and/or proving to one another that they have uncompromised states, and exchanging information to facilitate provision of the BIOS password at the request of a user. This information may include the password, a security key, instructions, and so forth.

The certification process between the computing device and the print device 110 may involve a variety of techniques with the goal of certifying that the other device can be trusted. While a variety of techniques may be used, a certification technique that proves that the device has not been changed by a malicious entity may involve calculating a value and transmitting that value to the second device. The second device may compare the value received to known values, have the value certified by a trusted third party or a manufacturer of one or both devices, and so forth.

When the BIOS password of computing device 100 needs to be recovered, computing device 100 may transmit the security key and/or other instructions to print device 110 to control print device 110 to provide the password by, for example, printing out the password. Additionally, print device 110 may be controlled to print instructions for entering the password to access the BIOS of computing device 100, and/or other instructions that may facilitate accessing the BIOS of computing device 100, recovering the BIOS of computing device 100, and so forth As mentioned above, in some examples, the computing device 100 may instead pair with a secure service 120. This may be desirable when computing device 100 is a mobile device and/or is owned by an organization whose employee(s) uses computing device 100. In this example, computing device 100 may store password information associated with the BIOS of computing device 100 with secure service 120. When computing device 100 seeks to have the BIOS password provided to a user, computing device 100 may signal secure service 120 to control print device 110 to print instructions for accessing the BIOS of computing device 100. In this example, print device 110 may be an arbitrary print device controllable by secure service 120. This may allow a user of computing device 100 to recover the BIOS password at a variety of locations.

In some examples, it may be desirable to ensure that the BIOS password is printed only for authenticated users of computing device 100. In some examples, authentication may be performed by the BIOS of computing device 100 based on, for example, a biometric or security device (e.g., a secure token) possessed by the user. In other examples, the authentication may be facilitated by secure service 120 via, for example another device accessible to the user of computing device 100. In other examples, print device 110 may authenticate the user, based on, for example, a biometric (e.g., scanning a fingerprint of the user on a scanner of the print device), receiving a password or personal identification number from the user on a keypad of the print device, or receiving a signal from a security device or security application stored on a device in possession of the authenticated user. Other techniques for authenticating the user are also possible.

Figure 2:
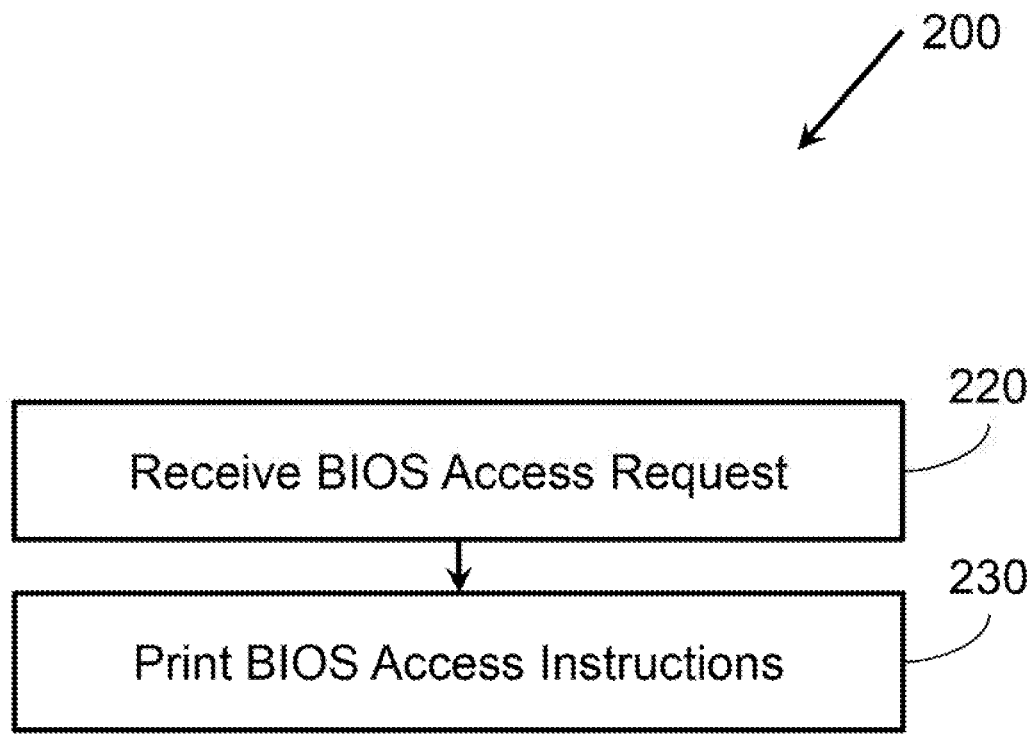
FIG. 2 illustrates a flowchart of example operations associated with BIOS access.

FIG. 2 illustrates an example method 200. Method 200 may be embodied on a non-transitory processor-readable medium storing processor-executable instructions. The instructions, when executed by a processor, may cause the processor to perform method 200. In other examples, method 200 may exist within logic gates and/or RAM of an application specific integrated circuit (ASIC).

Method 200 may perform various tasks associated with BIOS access. Method 200 includes receiving data associated with a basic input/output system (BIOS) access request at 220. The data may be received by a print device. The access request may be associated with a computing device. In some examples the access request may be received directly from the computing device. Here, the access request may be received over a direct connection (e.g., a USB or other cable), a wireless network, another wireless connection (e.g., NFC, Bluetooth low energy), and so forth. In other examples, the data associated with the access request may be received from a trusted third party. In this example, both the computing device and the print device may be registered with the trusted third party. In this example, the trusted third party may be an information technology support organization that is run by a manufacturer or seller of the print device and/or the computing device, by an employer of a user of the print device and/or the computing device, and so forth. By registering the print device and computing device using techniques described herein with the trusted third party, users of the computing device may be able to obtain access to their BIOS in a variety of locations.

Method 200 also includes printing a set of instructions for accessing the BIOS of the computing device at 230. The instructions may include, for example, a password to be entered in the BIOS of the computing device. In other examples, the instructions may describe a process for restoring the computing device to a known valid state. This state may be, for example, a factory default state, a known valid prior state, a new valid state to be retrieved from a known secure location (e.g., a local disc, a remote server) and so forth.

Figure 3:
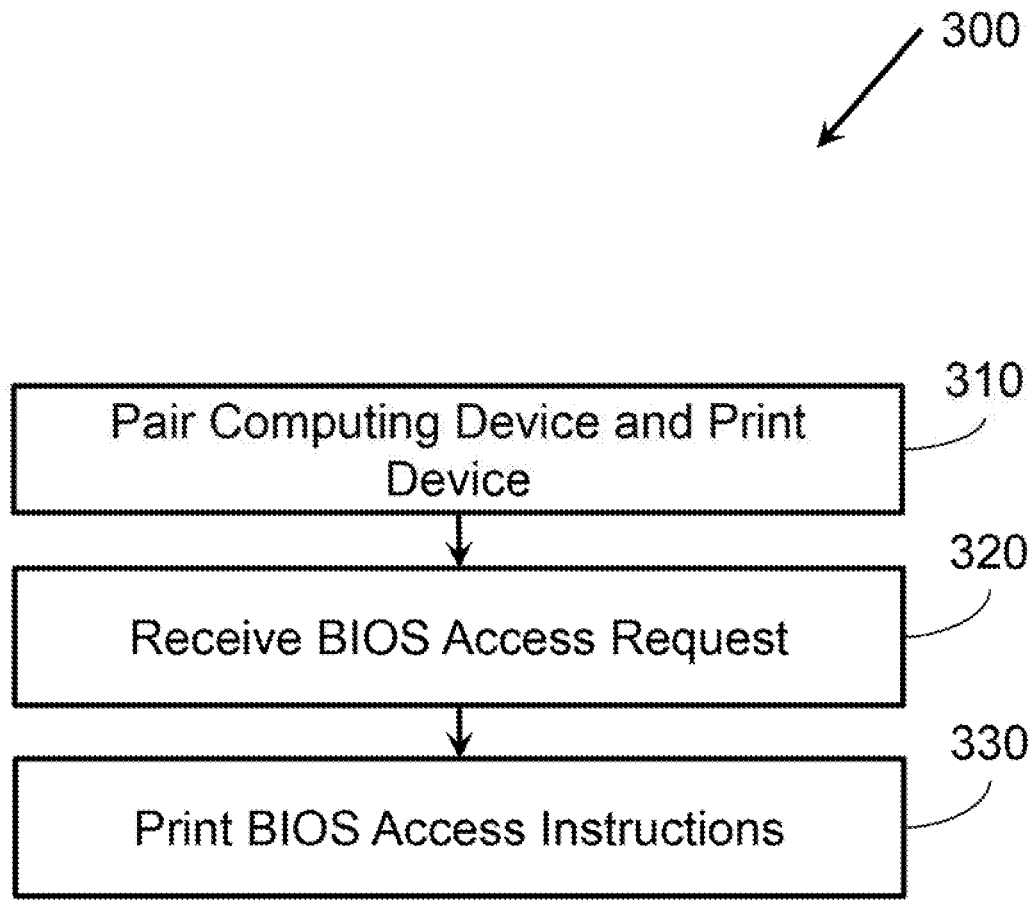
FIG. 3 illustrates another flowchart of example operations associated with BIOS access.

FIG. 3 illustrates another method 300 associated with BIOS access. Method 300 includes several actions similar to those described above with reference to method 200. For example, method 300 include receiving a BIOS access request at 320, and printing BIOS access instructions at 330.

Method 300 also includes pairing the computing device and the print device at 310. Pairing the computing device and the print device may include, for example, validating a state of the computing device, providing data, to the computing device to allow validation of a state of the print device, and storing data received from the computing device to be used when printing the instructions for accessing the computing device. This state information may be embedded in the print device and/or the computing device by manufacturers of the devices. This data may be, for example, a password. Pairing the computing device and the print device may also include storing a secure key in the print device. Here, the data associated with the BIOS access, request may include the secure key.

Figure 4:
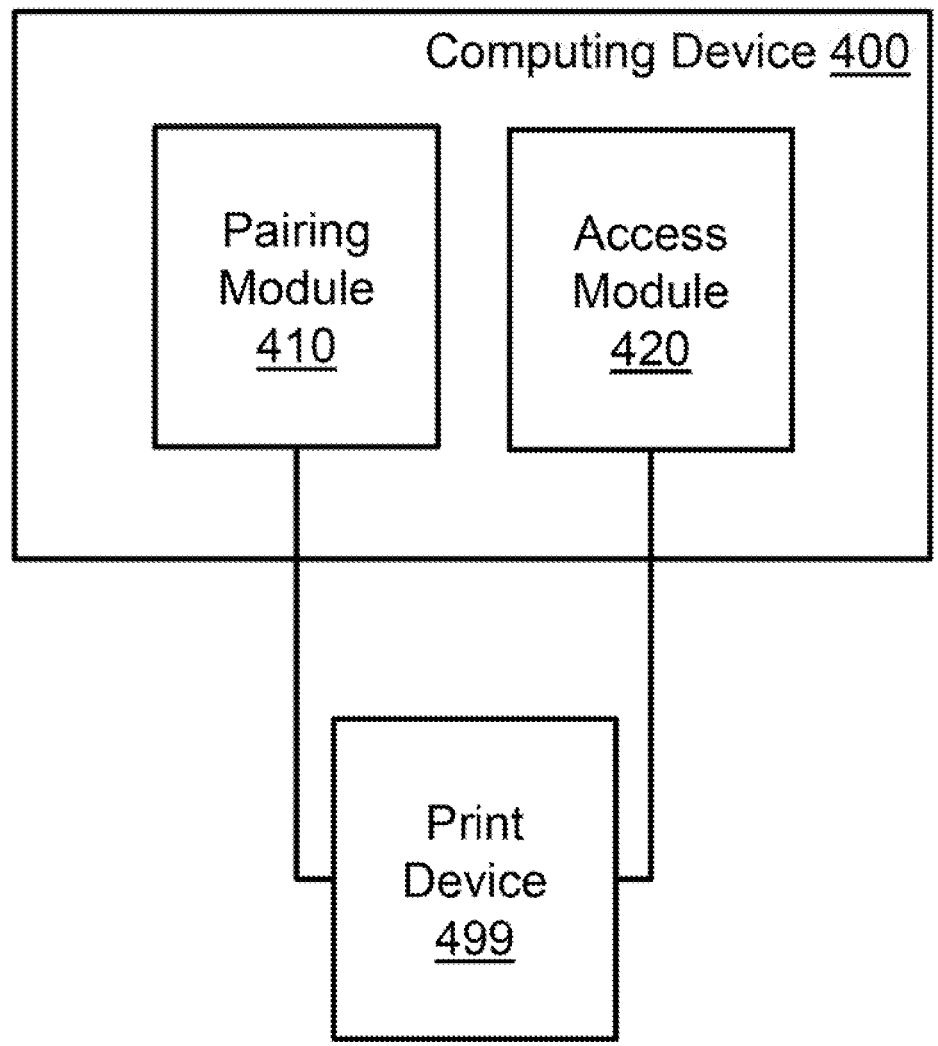
FIG. 4 illustrates an example computing device associated with BIOS access.

FIG. 4 illustrates a computing device 400. Computing device 400 includes a pairing module 410, Pairing module 410 may validate a state of a print device 499. Validating the state of print device 499 may include comparing a validation value received from print device 499 to an expected value. Pairing module 410 may also provide state information to print device 499 to allow print device 499 to validate a state of device 400. Upon completion of this mutual successful validation, pairing module 410 may store a security value in print device 499. In some examples, pairing module 410 may also store a basic input/output system (BIOS) password in print device 499.

Computing device 400 also includes an access module 420. Access module 420 may transmit the security value to print device 499 in response to an attempt to access a BIOS of computing device 400. In various examples, the access module may transmit the security value to print device 499 after verifying connection of computing device 400, after receiving a credential (e.g., a value, a signal from a security device) from an authorized user, and so forth. Transmitting the security value to print device 499 may control print device 499 to print instructions for accessing the BIOS of computing device 400. When print device 499 stores a password for accessing the BIOS of computing device 400, the instructions for accessing the BIOS of computing device 400 may include instructions for entering the password in the BIOS of computing device 400. In other examples, the instructions for accessing the BIOS of computing device 400 may include instructions for restoring the BIOS of computing device 400 and/or an operating system of computing device 400 to a known valid state.

Figure 5:
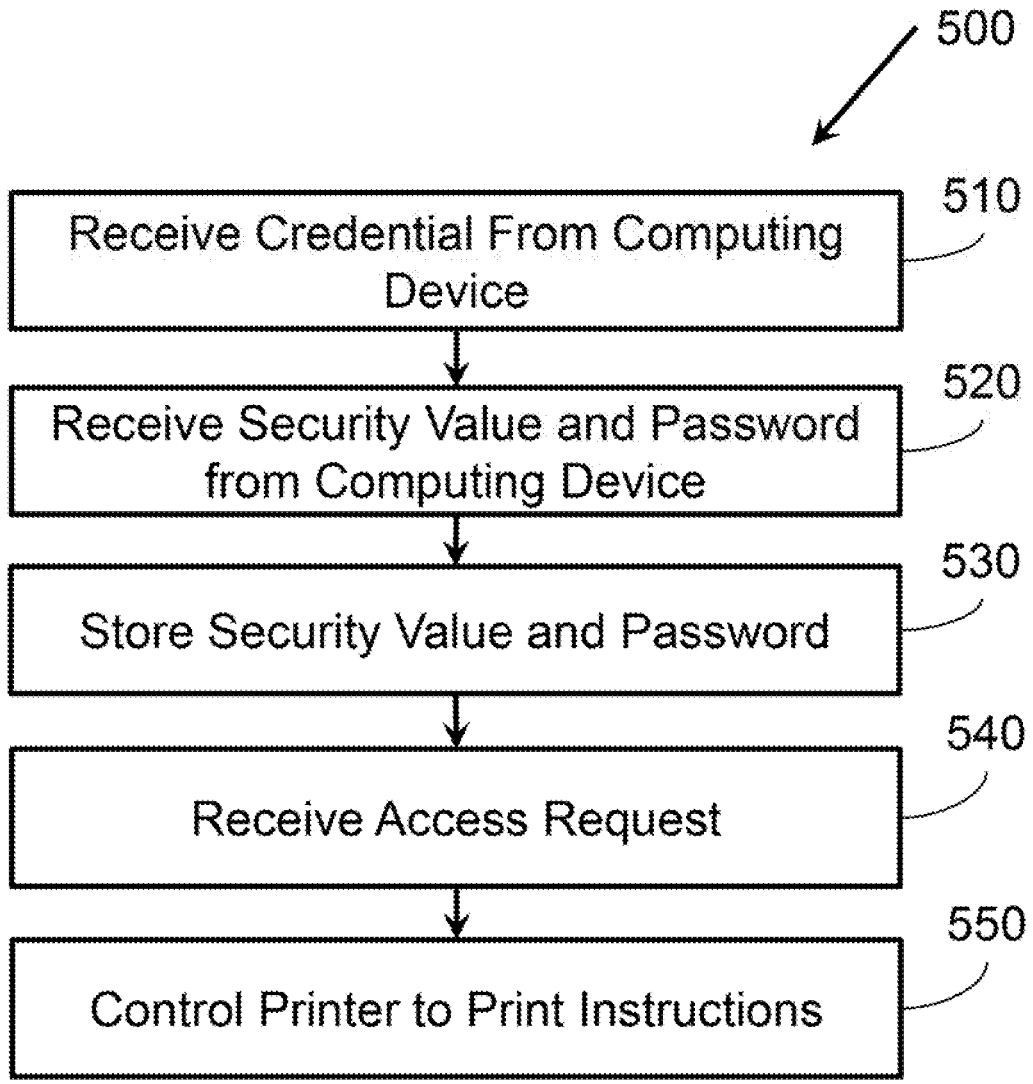
FIG. 5 illustrates another flowchart of example operations associated with BIOS access.

FIG. 5 illustrates another method 500 associated with BIOS access. In various examples, method 500 may be performed by a printer, or a trusted server device capable of controlling a printer to take actions in accordance with method 500. Method 500 includes receiving a credential from a computing device at 510. The credential may indicate that the computing device is in a known valid state. As discussed above, the credential may be a value generated based on hashing a portion of code associated with a BIOS.

Method 500 also includes receiving a security value and a password from the computing device at 520. The password may be associated with accessing a basic input/output system (BIOS) of the computing device. At 530, method 530 includes storing the security value and password.

Method 500 also includes receiving an access request from the computing device at 540. The access request may include the security value. After receiving the access request, method 550 includes authenticating a user. The user may be authenticated, at a print device at which the user seeks to print instructions for accessing the BIOS. The user may be authenticated at the print device by, for example, entering a password or personal identification number at the print device, via a security device or security application in a device possessed by the user, and so forth. Once the security value has been received and the user has been authenticated, method 500 includes controlling a printer to print instructions at 560. The instructions may be instructions for accessing the BIOS of the computing device and may also include the stored password. In other examples, the instructions may also describe a process for restoring the BIOS of the computing device to a known valid state.

In some examples, method 500 may include providing a credential to the computing device. The credential may be used by the computing device to determine that the computing device is communicating with a trusted device.

Figure 6:
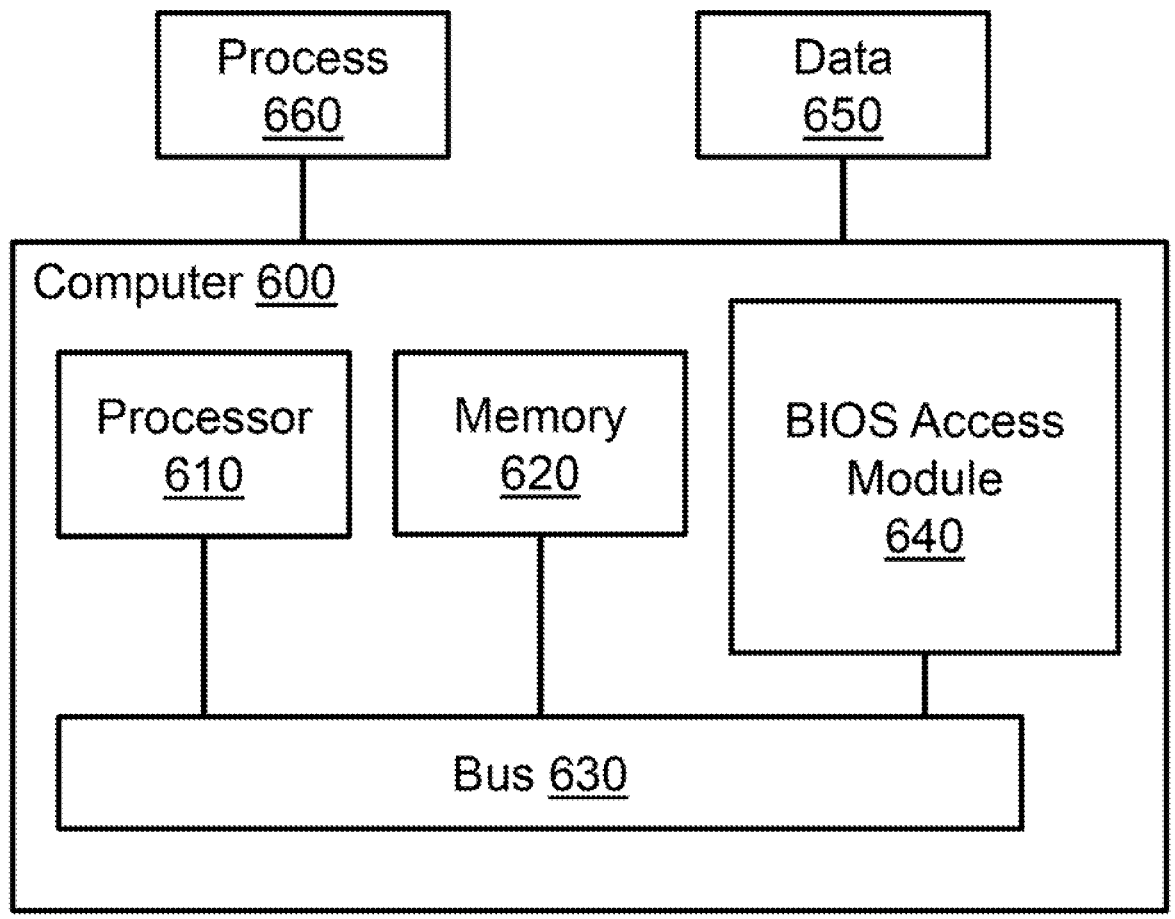
FIG. 6 illustrates an example computing device in which example systems, and methods, and equivalents, may operate.

FIG. 6 illustrates an example computing device in which example systems and methods, and equivalents, may operate. The example computing device may be a computer 600 that includes a processor 610 and a memory 620 connected by a bus 630. Computer 600 includes a BIOS access module 640. BIOS access module 640 may perform, alone or in combination, various functions described above with reference to the example systems, methods, and so forth. In different examples, BIOS access module 640 may be implemented as a non-transitory computer-readable medium storing processor-executable instructions, in hardware, as an application specific integrated circuit, and/or combinations thereof.

The instructions may also be presented to computer 600 as data 650 and/or process 660 that are temporarily stored in memory 620 and then executed by processor 610. The processor 610 may be a variety of processors including dual microprocessor and other multi-processor architectures. Memory 620 may include non-volatile memory (e.g., read-only memory, flash memory, memristor) and/or volatile memory (e.g., random access memory). Memory 620 may also be, for example, a magnetic disk drive, a solid state disk drive, a floppy disk drive, a tape drive, a flash memory card, an optical disk, and so on. Thus, memory 620 may store process 660 and/or data 560. Computer 600 may also be associated with other devices including other computers, devices, peripherals, and, so forth in numerous configurations (not shown).

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the scope of the disclosure. Thus, the present disclosure is not intended to be limited to the examples shown herein but is to be accorded the widest scope consistent with the principles and novel features disclosed herein.

What is claimed is:

1. A method comprising:
   pairing a computing device and a printer, wherein pairing the computing device and the printer comprises:
      validating a state of the computing device,
      providing state information for the printer to the computing device for validation by the computing device, and
      storing, in the printer, a first security value generated by the computing device in response to validation, by the computing device, of the state information for the printer and validating the state of the computing device;
   receiving, by the printer from the computing device, instructions for accessing a basic input/output system (BIOS) of the computing device, wherein the instructions include a password to the BIOS of the computing device;
   storing, in the printer, the instructions for accessing the BIOS, including the password to the BIOS, of the computing device;
   receiving, by the printer, a request to print the instructions for accessing the BIOS, including the password to the BIOS, of the computing device, wherein the request includes a second security value;
   determining that the first security value stored in the printer corresponds to the second security value included in the request;
   retrieving, by the printer, the instructions for accessing the BIOS, including the password to the BIOS, of the computing device that are stored in the printer; and
   printing, by the printer, the instructions for accessing the BIOS, including the password to the BIOS, of the computing device.

2. The method of claim 1, wherein the request to print instructions for accessing the BIOS is received from the computing device.

3. The method of claim 1, wherein pairing the computing device and the printer further comprises:
   authenticating a user of the computing device.

4. The method of claim 3, wherein pairing the computing device and the printer further comprises storing a secure key in the printer.

5. The method of claim 1, wherein the request to print instructions for accessing the BIOS is received from a trusted third party with which the printer and computing device are registered.

6. The method of claim 1, wherein validating the state of the computing device comprises validating a credential generated from code associated with the BIOS of the computing device.

7. The method of claim 1, wherein the instructions for accessing the BIOS also describe a process for restoring the computing device to a known valid state.

8. The method of claim 1, wherein the state information for the printer is embedded in the computing device by a manufacturer of the printer.

9. A printer comprising:
   a memory to store a password for the basic input/output system (BIOS) of a computing device and print instructions for accessing the BIOS of the computing device, wherein the instructions for accessing the BIOS of the computing device include instructions for entering in the BIOS of the computing device the password for the BIOS;

a processor in communication with the memory, wherein the processor is to:
  pair the printer with a computing device, wherein to pair the printer with the computing device the processor:
    validates a state of the computing device,
    provides state information for the printer to the computing device for validation by the computing device, and
    stores, in the memory, a first security value generated by the computing device in response to validation by the computing device of the state information for the printer and validating the state of the computing device;
  receive a request to print the instructions for accessing the BIOS, including the password to the BIOS, of the computing device, wherein the request includes a second security value;
  determine that the first security value stored in the memory of the printer corresponds to the second security value included in the request;
  retrieve, from the memory of the printer, the instructions for accessing the BIOS, including the password to the BIOS, of the computing device; and
  print the instructions for accessing the BIOS, including the password to the BIOS, of the computing device.

10. The printer of claim 9, wherein the request to print instructions for accessing the BIOS is received from the computing device.

11. The printer of claim 9, wherein the request to print instructions for accessing the BIOS is received from a trusted third party with which the printer and computing device are registered.

12. The printer of claim 9, wherein the instructions for accessing the BIOS of the computing device also describe a process for restoring at least one of the BIOS of the computing device or an operating system of the computing device to a known valid state.

13. The printer of claim 9, wherein to pair the printer with the computing device, the processor also stores a secure key in the memory of the printer.

14. The printer of claim 9, wherein to validate the state of the computing device, the processor validates a credential indicating that the computing device is in a known valid state.

15. The printer of claim 9, wherein to pair the printer with the computing device, the processor also authenticates a user of the computing device.

* * * * *